United States Patent [19]

Clarke et al.

[11] 4,399,500

[45] Aug. 16, 1983

[54] MULTIMODE BASE DRIVE CIRCUIT FOR POWER SWITCHING TRANSISTOR

[75] Inventors: Patrick W. Clarke, Murray Hill; Robert E. Schroeder, Flanders, both of N.J.

[73] Assignee: Bell Telephone Laboratories, Incorporated, Murray Hill, N.J.

[21] Appl. No.: 278,349

[22] Filed: Jun. 29, 1981

[51] Int. Cl.$^3$ .............................................. H02P 13/20
[52] U.S. Cl. ..................................... 363/97; 307/270; 363/21
[58] Field of Search ................ 307/270, 241, 280, 240, 307/253; 363/20, 21, 24, 25, 97

[56] References Cited

U.S. PATENT DOCUMENTS

| | | | |
|---|---|---|---|
| 3,736,496 | 5/1973 | Lachocki | 363/21 X |
| 3,999,086 | 12/1976 | Ekelund | 307/270 |
| 4,336,587 | 6/1982 | Boettcher, Jr. et al. | 363/24 X |

*Primary Examiner*—William M. Shoop

[57] ABSTRACT

A base drive circuit for a power switching transistor in a power inverter circuit utilizes a center tapped current transformer winding to regeneratively couple the collector current of the power switching transistor to its base drive electrode. A first segment of the center tapped transformer winding is coupled via a control transistor to provide proportional base drive to the power transistors when it is biased into conduction.

This forward drive mode continues until the control transistor is biased nonconducting, at which point, the second segment of the center tapped transformer winding is connected to the base drive electrode to provide a reverse drive current to the power transistor base to provide rapid turn-off and reset the transformer.

A supplemental drive path coupled to a converter power source via a diode to the control transistor operates to supply additional drive current therethrough to the power transistor at the turn-on transition in order to eliminate the quasi-saturation region that normally exists in a regeneratively driven power switching transistor at turn-on.

10 Claims, 2 Drawing Figures

MULTIMODE BASE DRIVE CIRCUIT FOR POWER SWITCHING TRANSISTOR

BACKGROUND OF THE INVENTION

1. Field of the Invention

This invention is concerned with drive circuits for power switching transistors utilized in power conversion circuits. It is specifically concerned with drive circuitry that is operative to maintain the operating locus of the power switching transistor operating points within safe operating limits and, more particularly, it is concerned with improvements to such circuits to improve the operating locus at certain critical regions to minimize device dissipation thereby improving the conversion efficiency of the power switching circuit.

2. Description of the Prior Art

Continued efficient and reliable operation of high power switching transistors in power conversion circuits, requires a base drive circuit that consistently operates these transistors within safe operating limits defined by the characteristic parameters of the transistor. Consideration of secondary breakdown failure in the transistor, due in part to circuit parameters, is an added reason to strictly maintain its operating locus within strictly defined safe voltage and current limits, since these limits define the power dissipation that can be handled safely by the power transistor. These limits tend to be most critical at certain well-defined transition stages of the operating point locus.

Conventionally, recognized operating stages of power switching transistors usually include a conducting state and a nonconducting state and the intervening turn-on/turn-off switching transition states. During each one of these operating states, the drive circuit must operate to minimize circuit and transistor power dissipation and maintain the operating locus of the power switching transistor within the safe operating region to assure its reliable operation.

For example, in the conducting state, the base drive circuit must provide high current drive levels to bias the transistor deep into saturation in order to keep the voltage drop across the conductive path of the transistor at the lowest possible level to minimize power dissipation within the transistor. Failure to keep this drive high could result in significant power dissipation therein, lowering the conversion efficiency of the switching circuit and in the extreme case, eventually cause a thermal runaway condition leading to the destruction of the transistor.

During the nonconducting state, the drive circuit operates to keep the transistor biased nonconducting. Negligible current flows through the transistor thereby preventing power dissipation in the device.

Normally in power switching transistors, the most critical relationship is power dissipation associated with the switching between states. The transition states from on to off and off to on are critical, due to the undesirable simultaneous occurrence of significant voltage and current levels across and through the main conductive path of the transistor.

For example, during the turn-on transition interval, when the transistor is switching from a nonconducting state to a conducting state, the base drive circuit must drive the transistor through this transition state to the conduction state as quickly as possible in order to reduce the time length interval of simultaneous high voltage and high current in the transistor to as small a value as possible. To achieve this objective, the base drive circuit must supply a large initial base drive current to the transistor.

During the turn-off transition interval, when the transistor is switched from a conducting state to a nonconducting state, the base drive circuit must provide a reverse base drive current to remove excess stored charge in the base-emitter junction to shorten this delay. After this delay time, the circuit applies a reverse bias voltage across the base-emitter junction to counteract the effects of any remaining stored charge in the device to avoid current "tailout" or the asymptotic decrease in collector current to zero with large collector-to-emitter voltage across the transistor. If a turn-on or turn-off operation is too slow, the power dissipation in the transistor could degrade the conversion efficiency of the switching circuit and in the extreme case cause a thermal runaway condition.

One technique in the prior art for achieving some of these objectives has been to use regenerative base drive arrangements in which, inductive coupling of the collector current is used to supply a proportional base drive current to the power transistor. Such an approach is disclosed in U.S. Pat. Nos. 3,999,086; 3,983,418 and 3,930,170. These regenerative arrangements provide the necessary gain to assure that the locus of the operating points of the switching transistor in its conducting states minimize power loss and is safely within a saturated conductive region. However at the initiation of the conduction state during the turn-on transition time, the collector-emitter voltage of the switching transistor does not drop to the low saturated value of the conduction state until a time interval of several microseconds has passed. Since this delay in voltage reduction is coincidental with a high collector current in the transistor, significant power dissipation occurs within the switching transistor. Prior art regenerative circuits do not supply a sufficient base drive current and permit a quasi-saturation region resulting from apparent lower device gain during this interval.

A second problem manifests itself when a power switching transistor is operated at a relatively high frequency, due to stored charge in the junction regions. It is well-known in the art that this charge storage tends to prolong current conduction in the transistor beyond the application of cut-off base drive.

A transistor base drive circuit disclosed in U.S. Pat. No. 3,999,086 has attempted to counteract this stored charge problem by using a transistor switch to supply reverse drive current derived from the regenerative feedback network to assist in removing the stored charge. However, the time required by this transistor switch to fully conduct limits its effectiveness in eliminating the turn-off delay due to stored charge.

To achieve high efficiency in switching high power transistors at a relatively high frequency, the base drive circuitry must function to effectively eliminate the quasi-saturation region and, in addition, speed up the elimination of stored charge therein during the reverse drive mode and, of course, provide sufficient forward drive to maintain the device in "hard" saturation during the conduction interval.

SUMMARY OF THE INVENTION

Therefore, in accord with the principles of the invention, a base drive circuit is disclosed that generates a complex drive current waveform to maintain the locus of operating points of a power switching transistor within high efficiency and safe operating regions. A particular embodiment of the base drive circuitry includes a proportional feedback circuit which regeneratively couples a main conductive path electrode of the power switching transistor to its drive electrode to supply proportional base drive thereto. This feedback circuit is periodically enabled by a control transistor which completes a circuit path in the feedback circuit in response to a trigger circuit and thereby enable regeneration to start the turn-on of the power transistor.

A supplemental drive path augments the regenerative feedback path. It includes a diode or unidirectional coupling device which couples the power circuits voltage source directly to the control transistor conductive path under certain conditions. When the primary trigger signal initiates regenerative action by turning on the control transistor, added drive current is supplied through the supplemental drive path at the beginning of the turn on of the power transistor until a condition of hard saturation is attained. This added drive current signal supplies enough added current to overcome the apparent lower device gain at turn-on to eliminate the quasi saturation region condition and hence, reduce power dissipation in the transistor at turn-on. The supplemental drive path could conduct during the entire saturation interval if the collector current exceeds a normal limit where the fixed proportional drive current is not large enough to overcome a transistor current gain reduction during an overload. Under this condition, the under driven transistor pulls out of saturation and the collector-emitter voltage rises across the device conducting a large current. This drawback with prior art circuits is avoided with the action of the supplemental drive path which supplies additional current drive to the transistor if the collector-emitter voltage rises across a conducting transistor.

The transformer in the regenerative feedback circuit includes a center tapped secondary winding. One-half winding segment is used to supply the regenerative forward drive; the second half winding segment is used to supply reverse drive and is switched into the drive circuitry by a series connection of a zener diode and high speed hot carrier or majority carrier type diode. These diodes conduct in response to the voltage increase in the regenerative winding, when the control transistor cuts off, to couple the second half winding to supply immediate reverse "sweep-out" drive current to the power transistor at the turn-off transition. Additional base drive circuitry is provided to enhance the fall time of the collector current at the end of the conduction interval and avoiding collector current tailout at turn-off by applying a reverse base emitter voltage to the power transistor.

The combined drive circuit, therefore, advantageously provides a complex base drive current waveform to optimize the locus of operating points of the power switching transistor in its current voltage plane by furnishing a drive current proportional to the collector current during its saturated mode; providing additional base drive current when the transistor is just turning on and is not yet saturated or pulling out of saturation during an overload; providing a rapidly switched "sweep-out" current proportional to the collector current at turn-off; and maintaining a reverse base emitter voltage to enhance fall time of the collector current.

BRIEF DESCRIPTION OF THE DRAWING

The invention may be readily understood by reference to the description hereinbelow and the accompanying drawing in which.

DETAILED DESCRIPTION

Figure 1:
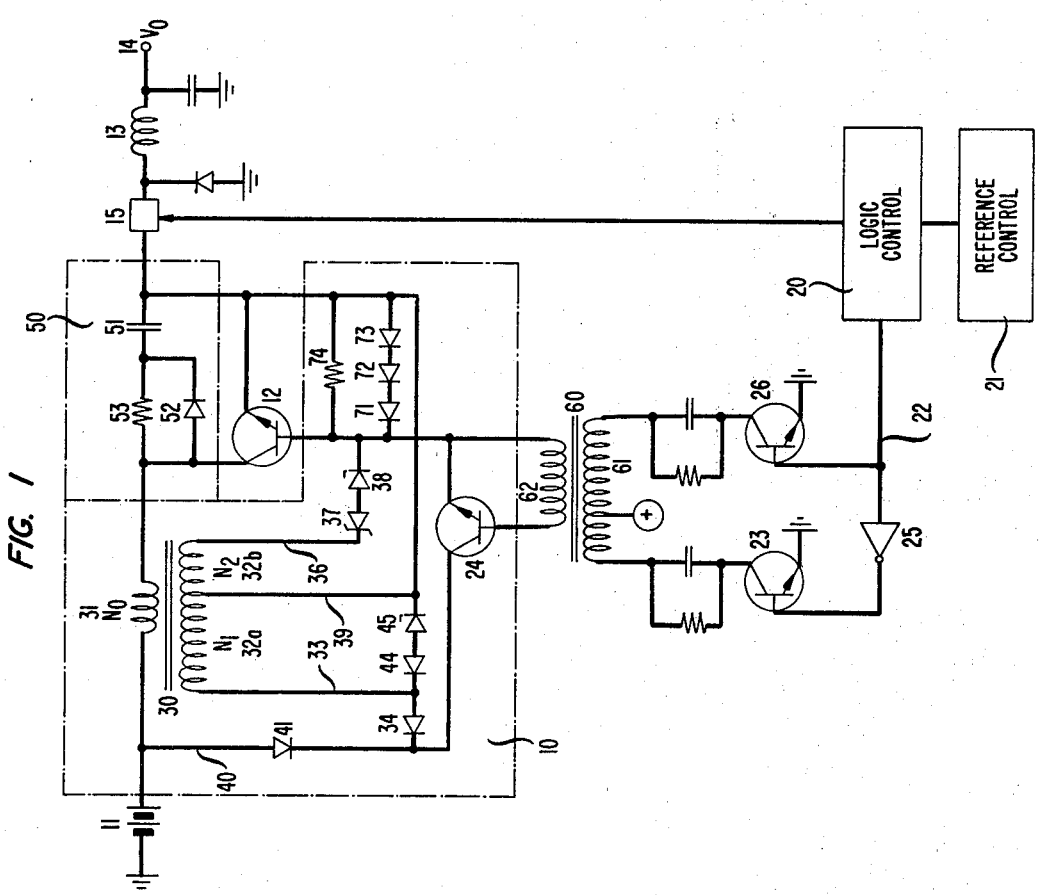
FIG. 1 is a block and schematic diagram of a power converter including a base drive circuit for the power switching transistor embodying the principles of the invention.

A switching regulator is shown in FIG. 1 including a single power switching transistor 12 and a base drive circuit therefore embodying the principles of the invention. DC voltage supplied by a voltage source or battery 11 is inverted by power switching transistor 12 and coupled through an output filter inductor 13 to an output terminal 14. While a particular regulator is disclosed herein, it is to be understood that the base drive circuitry disclosed is general in nature and may be applied to both double- and single-ended power inverters of varying types and topological configurations.

A base drive circuit 10 connected to drive transistor 12 is responsive to feedback regulator circuitry which supplies trigger signals to periodically initiate and terminate the conduction transition in the power switching transistor 12. In the particular example herein, a current programming regulation scheme is utilized although the application of a drive circuit according to the invention to power transistors of an inverter is not limited to this particular arrangement. Current programming regulation is a current control technique used to achieve voltage regulation.

Current flow through the main conduction path (collector-emitter path) of transistor 12 is sensed with a current sensing device 15 and a voltage waveform thereof is coupled to logic control 20. A reference control voltage is generated by reference control 21 and is normally used by the controller to detect the deviation of the regulator's output voltage from a desired value. A clock signal contained in 20 periodically initiates conduction in the power transistor 12. When the voltage waveform proportional to current flow produced by 15 exceeds the reference control voltage, the conduction interval is terminated. Current programming regulation is disclosed in U.S. Pat. No. 4,148,097 issued to C. W. Deisch on Apr. 3, 1979.

The control logic 20 includes a clock therein which periodically supplies a trigger signal which causes the output on lead 22 to assume a high state. This signal biases transistor 26 conducting which, in turn, applies a bias signal via transformer 60, to bias control transistor 24 conducting. Conduction in transistor 24 initiates turn on of power transistor 12 as described below. Current flow through transistor 12 is monitored by current sensing device 15 and when the voltage waveform magnitude produced by 15 equals the voltage reference set by the reference control 21, the output of the control logic 20 on lead 22 changes to a low level disabling transistor 26, enabling transistor 23, via polarity inverter 25 and thereby applying a reverse polarity signal to the primary winding 61 of transformer 60, in turn, biasing transistor 24 into cut off, via secondary winding 62, to eventually terminate conduction in power transistor 12.

As indicated, the conduction state of power transistor 12 is determined by the conduction state of control transistor 24, which is included in the base drive control circuit 10. The base drive control circuit 10 further includes a regenerative feedback transformer 30 having a primary winding 31, connected in series, with the collector-emitter electrode of the power transistor 12 and the voltage source battery 11. A secondary winding 32 has one terminal 33 coupled through a diode 34 to the collector-emitter electrode of control transistor 24. Its emitter is, in turn, coupled to the base electrode of power transistor 12. A second terminal 36 of secondary winding 32 is connected through a hot carrier or Schottky diode 37 and a zener breakdown diode 38 to the base electrode of power transistor 12. Transformer 30 is a current transformer preferably having a single turn primary winding 31, with multiturn secondary winding halves, to minimize the impedance it inserts in the main power path. The secondary winding 32 is center tapped with lead 39 connecting the center tap to the emitter electrode of the power transistor 12. Lead 39 is also connected to winding terminal 33 through serially connected diode 44 and zener diode 45. The number of turns for each of the two winding segments 32$a$ and 32$b$ of secondary winding 32 are independently determined by the base drive requirements of the power transistor 12 during conduction and nonconduction intervals, respectively.

A supplementary current path 40 including diode 41 directly connects the positive terminal of voltage source battery 11 to the collector-emitter of control transistor 24.

A turn-off loss reduction network 50, whose operation is well-known, is connected across the collector-emitter and emitter electrodes of power transistor 12 in order to momentarily shunt the main power path current flow from the inductive load away from an off-going transistor to reduce turn-off dissipation in 12. It includes a series connected capacitor 51 and diode 52. A resistor 53 shunts diode 52. This network 50 reduces power dissipation by utilizing capacitor 57, charged during the transistor 12 turn-off interval to control the rate-of-rise in voltage across the collector-emitter emitter of power transistor 12 as the current in 12 is being reduced at a rate controlled by the fall time of 12.

Figure 2:
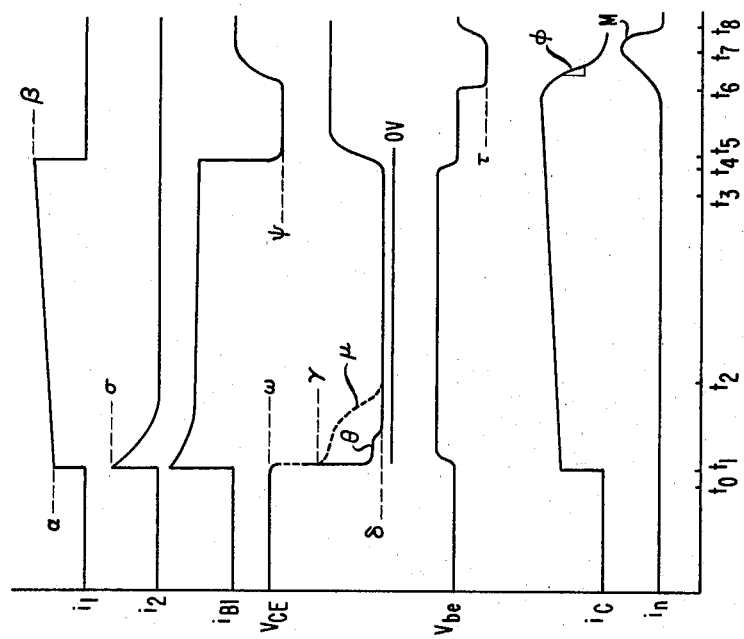
FIG. 2 discloses current and voltage waveforms to assist in understanding the operation of the circuit disclosed in FIG. 1.

The principles of the base drive circuit 10 may be best explained by describing its operation in driving the power transistor 12. A periodic clock pulse generated in the control logic circuit 20 causes the output on lead 22 to go high thereby driving transistor 26 into conduction. Current flow in primary winding 61 induces a current in secondary winding 62, which supplies forward drive current driving control transistor 24 into conduction. This clock pulse initiating forward drive current occurs at the time $t_o$ as shown in the waveform diagram of FIG. 2. Due to inherent signal delay, however, the transistor 24 is biased into conduction to supply drive current at the time $t_1$. The resultant base drive current $i_{Bi}$ (shown in FIG. 2) comprises the regenerative component $i_1$ and a supplemental current $i_2$ described below. The enabled conduction path of transistor 24 completes a circuit path from terminal 33 through diode 34 to the base electrode of power transistor 12. Collector current $i_c$ (shown in FIG. 2) begins to flow through primary winding 31 at time $t_1$ and a secondary current $i_1$ determined by the turns ratio of primary winding 31 and the segment 32$a$ of secondary winding 32 flows through diode 34, and through the main conduction path of control transistor 24 to the base electrode of power transistor 12. As shown in FIG. 2, current waveform $i_1$ rises quickly to some value $\alpha$ at $t_1$ and then, continuously but gradually rises to some max value $\beta$ at time $t_4$. The average value of current $i_1$ is determined primarily by the collector-emitter current $i_c$, the turns ratio of $N_o/N_1$, and the magnetizing current requirements of transformer 30. Winding segment 32$b$ does not interfere with this base drive signal flow because the breakdown voltage of zener diode 38 is selected to be larger than the total circuit loop voltage of winding 32$b$, diode 37 and the base-emitter voltage of transistor 12. This control interval may be characterized as a forward drive mode interval.

As power transistor 12 is biased into conduction at $t_1$, its collector-emitter voltage $V_{ce}$ drops rapidly from the nonconducting value at a high level $\omega$ to an intermediate level $\nu$ which is above the minimum hard saturation voltage level $\delta$ of waveform $V_{ce}$. Because of the inherent initial low gain behavior of transistor 12 the collector-emitter voltage $V_{ce}$ is not reduced to its desired saturation level $\delta$ until time $t_2$. Between time $t_1$ and $t_2$, power transistor 12 is in a quasi-saturation state and the collector-emitter emitter voltage $V_{ce}$ follows a trajectory from time $t_1$ to $t_2$ as indicated by dotted line $\mu$. Since the power transistor 12 is not in hard saturation, the collector-emitter current $i_c$, in combination with the quasi-saturation voltage level, causes considerable power dissipation in transistor 12.

To counteract this quasi-saturation condition, a supplemental mode base drive current is added to supplement the base drive current of the forward mode. This supplemental current is supplied via drive path 40 which couples the positive terminal of battery 11 to the collector-emitter of control transistor 24. This supplemental drive path 40 operates when transistor 12 is initially biased into conduction with its collector-emitter voltage larger than the sum of the voltage drop across diode 41, conducting transistor 24 and the base-emitter voltage of transistor 12. The supplemental drive current $i_2$ as shown in FIG. 2, results which when added to current $i_1$ in the composite base drive current $i_{B1}$ as shown in FIG. 2 has characteristics that include an initial peak value $\sigma$ followed by a rapid decay. This added peak current is sufficient to remove the locus of power transistor 12 from the quasi-saturation region between time $t_1$ and $t_2$ by supplying sufficient extra drive current, in response to collector-emitter voltage of transistor 12, to drive the operating locus of power transistor 12 immediately into hard saturation, whereby the collector-emitter emitter voltage $V_{ce}$ follows the $\theta$ trajectory immediately after turn-on. As soon as transistor 12 is in hard saturation, the voltage drops around the loop including the collector-emitter voltage of transistor 24 and the collector-emitter junction voltage of transistor 12 are such that diode 41 is back biased and the supplemental drive current is discontinued. This particular circuitry to supply supplemental dlrive current further allows the regulator to turn on into an overload without causing excessive dissipation at turn-on of the power switching transistor 12 since the added current keeps diode 41 forward biased.

The variable added current supplied through the supplemental drive path is active during the initial stage in turn on, with the voltage drop across diode 41, conducting transistor 24 and base-emitter voltage of 12 clamping the collector-emitter voltage drop across transistor 12 to a low saturation level instead of an uncontrolled larger value. At time $t_2$, the proportional current supplied by regenerative feedback through diode 34 is adequate to maintain the low saturation level and current $i_2$ terminates due to the reverse biasing of diode 41. During the balance of the conduction interval until $t_3$ occurs, the current $i_{B1}$ is sufficient to keep power transistor 12 in hard saturation.

At a time $t_3$ determined by the current sensed in current sensor 15 and the relative magnitude of a reference voltage supplied by reference control 21, the logic control 20 switches its output state to a low level. This signal biases transistor 26 nonconducting and as inverted by polarity inverter 25, biases transistor 23 conducting, which in turn, drives control transistor 24 nonconducting. This disconnects the regenerative drive of winding 32a from the base electrode of power transistor 12 eliminating the positive base drive current. The electrical response in winding 32b forces the current $i_{B1}$ to the negative level $\psi$ shown in FIG. 2 at time $t_4$.

Removal of the forward base drive current does not immediately cause power transistor 12 to switch into a nonconducting state inasmuch as current flow therein is maintained by recombination of excess minority carries stored in response to the previously applied base drive current $i_{B1}$. Results of this well-known stored charge phenomenon can be seen in FIG. 2, where the collector-emitter current $i_c$ continues to flow at full value after the forward base drive current $i_{B1}$ from the control transistor 24 has been removed and reversed in polarity at time $t_4$ and continues, in fact, until it finally begins to decay at time $t_6$. This reverse base drive current is applied to the base electrode of power transistor 12 at time $t_4$ in order to minimize the interval ($t_6-t_4$).

The base drive circuit 10 operates to speed up the discharge of this stored charge by providing a reverse drive or "sweep-out" current to the base electrode of power transistor 12. Collector current $i_c$ begins to decay at $t_6$ and reaches approximately zero at $t_7$. Turn-off loss reduction network 50 briefly supports the inductive load current established in transistor 12 prior to its turn-off. Capacitor 51's charging rate controls the rate-of-rise in collector-emitter voltage of transistor 12 in order to reduce turn-off dissipation therein as the collector-emitter current in transistor 12 is decreasing in the interval $t_6$ to $t_7$. The network 50 is located in the circuit topology such that the charging current $i_n$ in 50 augments the decreasing collector-emitter current in transistor 12 beyond $t_7$ and up to $t_8$. When the current goes to zero at $t_8$, a voltage reversal is induced by current flow in the energy stored in the magnetizing inductance of 30 and causes a discharge in winding 32 of transformer 30. Diode 34 is back biased by the reverse voltage in winding segment 32a, hence the current path for the magnetizing current is through zener diode 45 and diode 44 for resetting the core in 30 during the cut off interval of transistor 12. Diode 45 is selected with sufficient capacity to block current when the power transistor 12 is in the conducting mode.

The winding segment 32b has a turns ratio with respect to winding 31 selected to generate a proper reverse drive current level to achieve rapid sweep out of stored charge in the power transistor 12. During the previous conducting interval, no current flowed in winding segment 32b since Schottky diode 37 was reverse biased. At the instant of turn-on, the Schottky diode 37 is forward biased and the transformer 30 supplies a reverse drive current to the base electrode, which is shown as current level $\psi$ of current $i_{B1}$ between time $t_4$ and $t_6$. The use of a high speed Schottky or hot carrier diode is essential because the absence of recovery delay time of these diodes, as compared to PN type diodes is necessary to rapidly supply the reverse drive current to immediately sweep out the stored charge and also switch off rapidly when the voltage from winding 32 reverses during the reset interval of the core 30, to avoid forward drive current flow into the base of transistor 12 during the cut-off interval. The use of a slower switching device in place of Schottky diode 37, such as a transistor switch, for example, would not provide sufficient switching speed to significantly reduce the time interval of collector-emitter current flow due to stored charge. Since the winding 34b is regeneratively connected to reflect collector-emitter current, the base drive current level $\psi$ of $i_{B1}$ to remove or sweep out the stored charge is proportional to the collector-emitter current $i_c$ which it is countering in order to terminate it.

The reverse base drive current $i_{B1}$ and the collector-emitter current $i_c$ both begin to decay to zero at time $t_6$ after the stored charge has been swept out. It is desirable to increase the decay slope $\alpha$ of collector-emitter current $i_c$ to again minimize power dissipation during the turn-off interval. This slope $\frac{s}{s}$ is increased over its normal value by provision in the base drive circuit 10 to apply a reverse base emitter bias voltage $V_{be}$ (FIG. 2) to the power transistor 12 at time $t_6$. This reverse bias voltage level $\tau$ of $V_{be}$ is supplied by the reverse voltage of winding 32b as the collector-emitter current falls. To control this reverse base emitter voltage level $\tau$, the series connected diodes 71,72 and 73 are shunted across the base emitter junction of power transistor 12 to act as a voltage clamp to keep the voltage below the junction breakdown level of the transistor. Capacitor 51 of turn-off loss reduction network 50 operates to maintain the remaining power path current flow at turn-off which is reflected through winding 32b to further enhance the turn-off process and the fall time. Sustaining this reverse bias after the time $t_7$ eliminates collector-emitter current tailout in transistor 12 which would produce dissipation therein.

When the collector-emitter current $i_c$ and the network current $i_n$ decay from M to zero at time $t_8$, the power transistor 12 is in its nonconductive state, a cut-off state, and the drive circuit 10 is effectively disconnected from the power transistor 12 with the exception of resistor 74, which diverts leakage current from the collector-emitter junction away from the base emitter junction. The time interval of the cut-off state allows the regenerative transformer core to be reset in preparation for the subsequent drive operation cycle. Reset is accomplished by the existing magnetizing current in 30 flowing through diode 44 and zener diode 45 in a linear decaying ramp which provides sufficient volt-second during the transistor 12 cut-off interval to offset the volt-seconds accumulated during the transistor 12 conduction interval to completely reset the core of transistor 30 in preparation for the forthcoming conduction interval of transistor 12.

While a particular base drive circuit embodying the principles of this invention has been described in detail, various modifications may be made thereto within the scope of the invention. These modifications will suggest themselves to those skilled in the art. An obvious example is coupling the base drive circuit to the emitter circuit of the power transistor rather than the collector-emitter circuit as disclosed. Also, the magnetizing current flow of transformer 30 can be diverted in a reverse direction in the base-emitter junction of transistor 12 by a simple reconnection of the cathode of zener diode 45 from lead 39 to the base of transistor 12. This current flow during the cut-off interval of transistor 12 can further benefit circuit operation by insuring a reverse bias voltage across transistor 12 even after network current $i_n$ has decayed to zero to avoid false conduction of transistor 12 during the intended cut-off interval.

What is claimed is:

1. A multimode base drive circuit for a power switching transistor comprising;
    a regenerative feedback circuit coupling a main conduction path electrode of the power switching transistor to its drive electrode and including a control transistor to complete a circuit path in the feedback circuit and enable regeneration, and
    a supplemental drive path including a unidirectional conducting device and coupling a power source in series with the main conduction path electrode of the power transistor to the control transistor whereby drive signals supplied by the regenerative feedback path at a switching transition of the power switching transistor from nonconduction to conduction are supplemented by adding a drive current signal through the supplemental drive path in response to a collector-emitter voltage of the power switching transistor when in a conduction state.

2. A multimode base drive circuit as defined in claim 1 wherein said regenerative feedback circuit includes a current transformer including a primary winding coupling the power source to a main conduction path electrode of the power transistor and a secondary winding having first and second winding segments in series,
    a first winding segment coupled to the base drive electrode through the control transistor and oriented to supply current to drive the power transistor into conduction, and
    a second winding segment coupled to the base drive electrode of the power transistor through a hot carrier diode, the second winding segment and hot carrier diode oriented to supply current to drive this power transistor into a nonconduction state, the hot carrier diode being polarity oriented to disconnect the second winding segment from the base drive electrode when the first winding segment is supplying drive current to the power transistor.

3. A multimode base drive circuit as defined in claim 2 wherein said power transistor has its main conduction path connected in parallel with a turn-off loss reduction network including
    a series-connected diode and capacitor and further including a capacitor discharge path shunting the diode, and a string or series-connected diode shunting a base-emitter junction of the power transistor and coupling the capacitor to a base-drive electrode of the power transistor whereby the string of diodes clamps the base-emitter voltage to below a base-emitter junction breakdown level and permits a reverse voltage in a current loop including the second winding segment to apply a reverse voltage to enhance the fall time of collector current and avoid current tailout and an asymptotic decay of current to zero at said power transistor during transition from conduction to nonconduction of the power transistor.

4. A multimode base drive circuit as defined in claim 3 wherein said control transistor is biased through a control transformer including
    a secondary winding shunting its base-emitter junction and a primary winding having first and second control winding segments joined at a center tap coupled to a voltage source, and
    an end terminal of the first control winding segment coupled to an enabling transistor where its conduction biases, in turn, the control transistor conducting and an end terminal of the second control winding segment coupled to a disabling transistor where its conduction biases, in turn, the control transistor nonconducting.

5. A base drive circuit for a switching transistor in a power conversion circuit comprising;
    a regenerative feedback circuit including a current transformer having a sensing winding for sensing main power path current in the switching transistor and a first drive winding for supplying forward base drive current to the switching transistor proportional to the main power path current and a second drive winding for supplying a reverse base drive current to the switching transistor proportional to the remaining main power path current,
    a supplemental drive current path for coupling main power path current via a diode to the switching transistor for supplementing drive current at turn-on and operative so that the diode is reverse biased after the switching transistor is in hard saturation to remove said supplemental drive current, and
    a clamping means for coupling and limiting a reverse voltage generated by the second drive winding in order to enhance the fall of collector current at turn-off of the switching transistor.

6. A base drive circuit as defined in claim 5 wherein said second drive winding is coupled to a control electrode of the switching transistor through a fast recovery diode oriented to be forward biased by reverse voltage in the second drive winding, and
    a control transistor operative to disconnect the first drive winding from the switching transistor and induce the reverse voltage.

7. A base drive circuit as defined in claim 6 wherein the clamping means includes a plurality of clamping diodes in series with a total voltage drop rating less than a breakdown voltage of a switching transistor junction across which it is shunted and further connected in series with the fast recovery diode and the second drive winding.

8. A base drive circuit as defined in claim 7 further including
    a turn-off loss reduction network shunting a main power path of the switching transistor and including a storage capacitor coupled to supplement collector current at turn-off of the switching transistor, and maintain a voltage in the second drive winding to enhance turn-off.

9. A transistor drive circuit in a power inverter circuit including an input terminal, an output terminal, and a power switching transistor interconnecting the input and output terminal,
    the transistor drive circuit for biasing the power switching transistor into a conductive state including a current transformer having a current sensing winding connected in series with a main power path of the power switching transistor and a forward bias winding coupled to a control electrode of the power switching transistor and operative for supplying drive current thereto proportional to current in the current sensing winding to bias the power switching transistor conducting, and a supplemental drive circuit including a diode and interconnecting the input terminal to the control electrode and operative for supplying additional base drive current directly from a power source at the input terminal to the control electrode at a start of conduction of the power switching transistor to drive it into hard saturation and the diode responsive to attainment of hard saturation to become back biased and terminate the supplemental drive current, and the current transformer including a reverse bias winding coupled via a hot carrier diode to a control electrode of the power switching transistor and operative for supplying reverse drive current thereto proportional to current in the current sensing winding to bias the power switching transistor nonconducting, the hot carrier diode being forward biased by a reverse voltage in the transformer at the end of a conduction interval and coupling reverse drive to the control electrode.

10. A transistor drive circuit as defined in claim 9 further including
a control transistor switch for coupling the forward bias winding and the supplemental drive circuit to the control electrode, and a control transistor drive including a control transformer with a bias winding shunting the collector-emitter junction of the control transistor switch and a drive winding whose direction of energization is responsive to a binary output of a logic control circuit.

* * * * *